United States Patent Office 2,893,128
Patented July 7, 1959

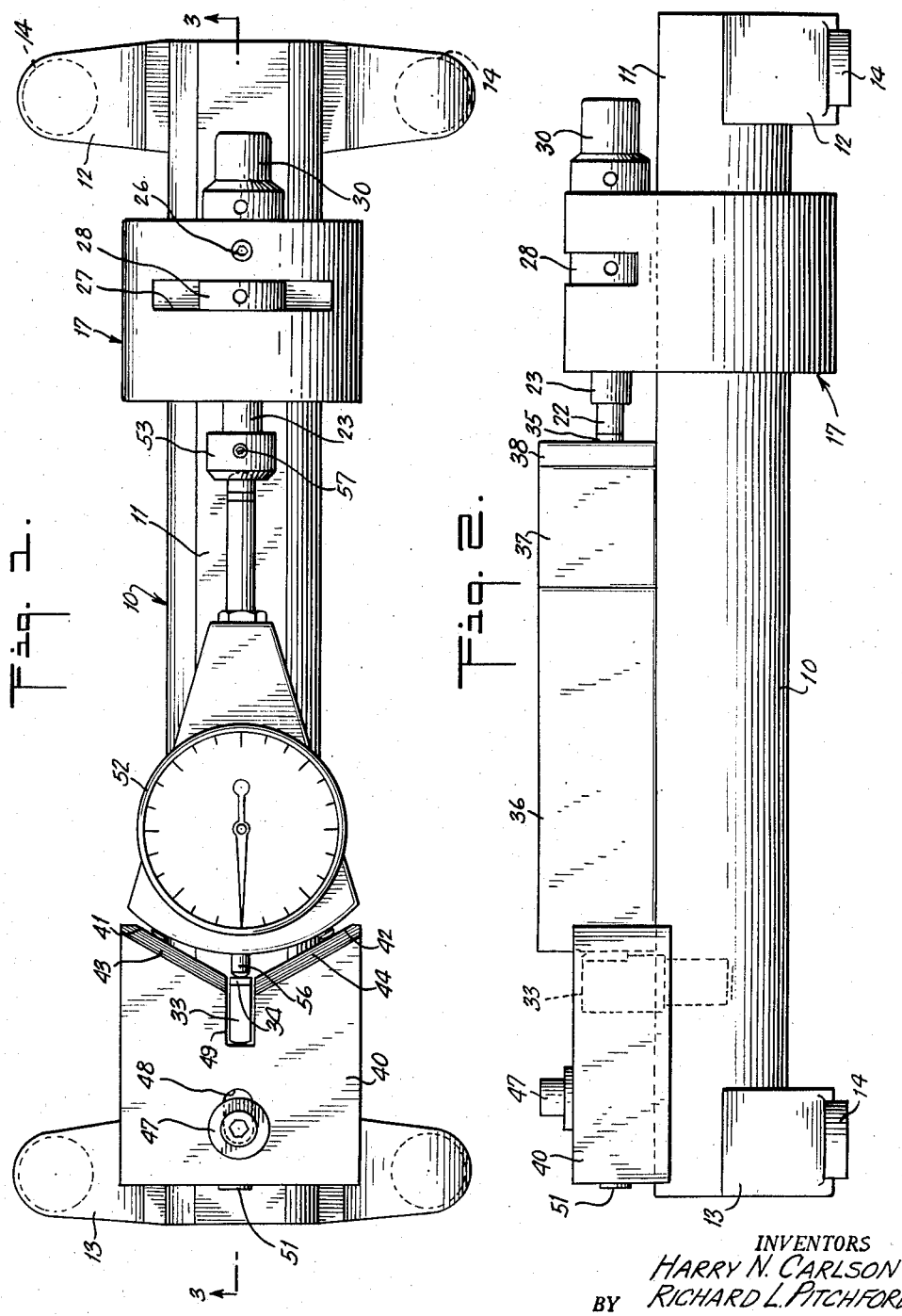

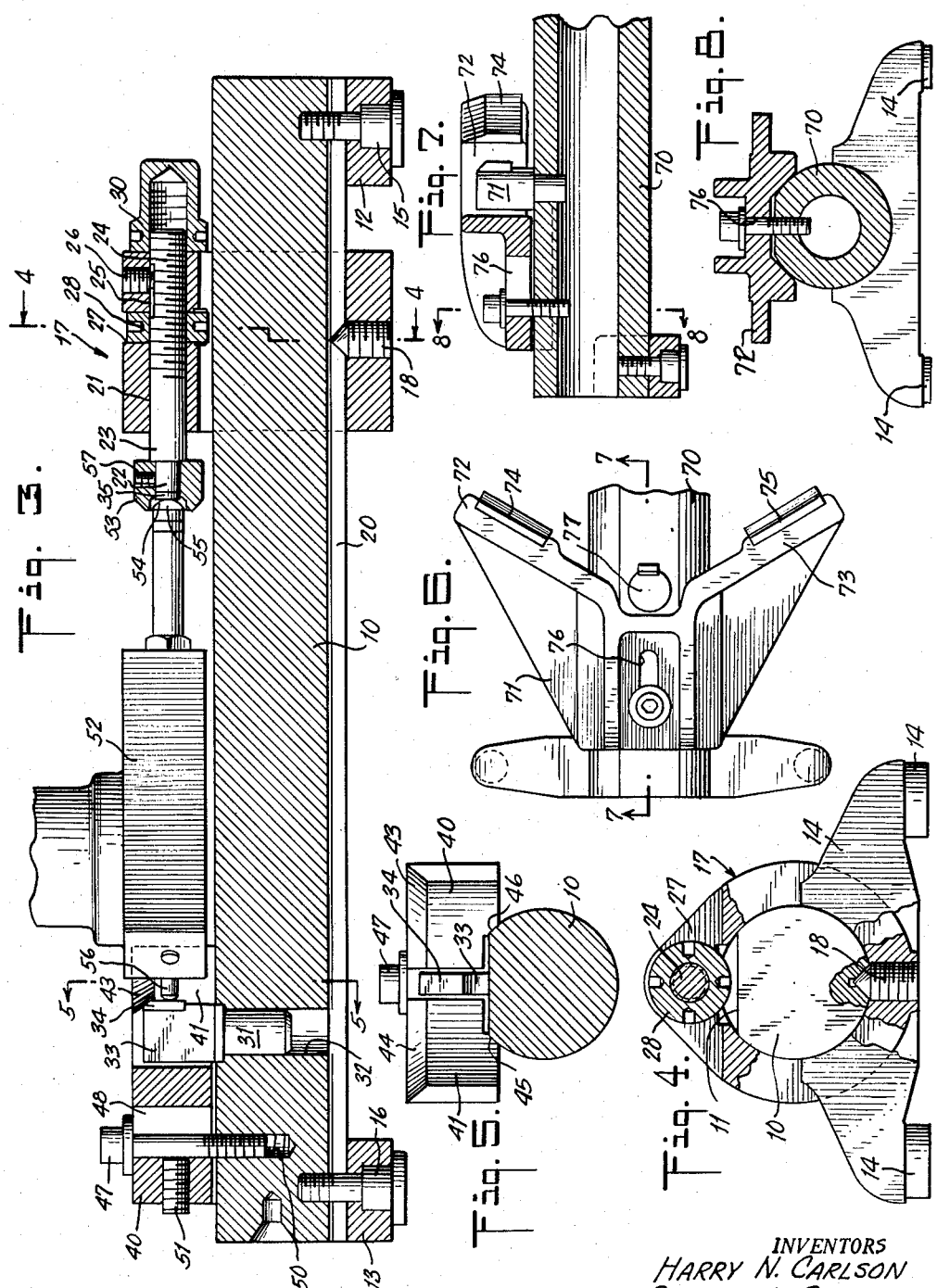

2,893,128

ADJUSTABLE SETTING MASTER FOR DIAL BORE GAGES

Harry N. Carlson, Poughkeepsie, and Richard L. Pitchford, Gardiner, N.Y., assignors to Standard Gage Company, Inc., Poughkeepsie, N.Y., a corporation of New York Application January 4, 1955, Serial No. 479,771

1 Claim. (Cl. 33—143)

The present invention relates to an adjustable setting master for dial bore gages and particularly to such a setting master which is provided with adjustable means for contacting the centralizing plungers of the dial bore gage thus assuring that the gage will be positioned during the setting in substantially the same manner as it will later be positioned in measuring.

In the past dial bore gages have been set to a ring master which necessitated a new master for each dimension to be gaged and, frequently, for each variation in tolerance of a gage dimension.

Since these ring masters are manufactured to individual order they are necessarily expensive and since a different master is required for each job, it is obvious that gaging cost is relatively high.

Our present invention provides an adjustable master for the setting of dial bore gages which is not only usable to set a dial bore gage of a particular size to any setting within its range, but is usable to set bore gages of different sizes so that it may replace many ring gages and thus reduce the cost of bore gaging operations by a very large amount.

The adjustable setting master of the present invention is arranged so that it may be set to a desired dimension through the use of the ordinary gage blocks such as Johansson or Hoke blocks, after which the blocks are removed and the master utilized in setting a dial bore gage.

The device is extremely simple in construction and is readily set to a desired value. At the same time the movable parts thereof are precisely made so that the gaging surfaces will retain their parallelism at any point within the range of adjustability of the instrument.

It is an object of the invention to provide an adjustable setting master for dial bore gages.

It is another object of the invention to provide such a setting master having a range of adjustability such that dial bore gages of a number of sizes may be set thereby.

It is another object of the invention to provide such an adjustable setting master which is simple in construction and which, at the same time, can be readily precisely manufactured so that the gaging surfaces maintain their faces parallel at all times.

It is a further object of the invention to provide such a setting master for dial bore gages having adjustable faces for contacting the centralizing plungers of the bore gage, thus assuring that the dial bore gage will be set to a dimension exactly equal to the desired diameter of bore to be gaged.

It is a still further object of the invention to provide means for facilitating the rocking of the bore gage when setting that gage to the master thus assuring that the dimension to which the gage is set is the minimum distance between the gaging anvils of the master in a vertical plane.

Other objects and features of the invention will be apparent when the following description is considered in connection with the annexed drawings, in which, Figure 1 is a top plan view of the setting master for dial bore gages which constitutes our invention. In this view a dial bore gage is shown in position in the setting master to thereby set the gage dimension to that previously set in the master by the use of gage blocks;

Figure 2 is a side elevation of the device of Figure 1. In this view a stack of Johansson blocks of a desired dimension is shown in place in the master with the master adjusted to the stack of blocks;

Figure 3 is a longitudinal cross-sectional view of the device of Figures 1 and 2, the view being taken on the plane of the line 3—3 of Figure 1. In this view a dial bore gage is shown in position to be set to the desired dimension;

Figure 4 is an end elevation view of the device from the right side thereof, the view being broken and showing portions thereof in section along the plane of the line 4—4 of Figure 3;

Figure 5 is a transverse vertical cross-sectional view of the device, the section being taken on the plane of the line 5—5 of Figure 2;

Figure 6 is a top plan view of a modification of the centralizing plunger positioning means;

Figure 7 is a longitudinal cross-sectional view of the modification of Figure 6, the view being taken on the plane of the line 7—7 of Figure 6; and Figure 8 is a transverse cross-sectional view of the modified plunger positioning means of Figures 6 and 7.

Referring now to the drawings there is shown at 10 a generally cylindrical bar which forms the bedplate of the device. The bar 10 is ground and lapped to a truly cylindrical form and is thereafter provided with a flat upper face 11 which is also ground and lapped so that the bar has highly polished and accurately dimensioned cylindrical and flat surfaces.

At either end of the bar 10 there is provided a supporting member, these members being designated 12 and 13. Each of these support members 12 and 13 has a rubber foot fastened thereto at either side thereof, the feet being all designated by the reference character 14. The upper surfaces of the supports 12 and 13 are formed with cylindrical depressions therein which mate accurately with the lower portion of the bar 10, the supports 12 and 13 being fixed to the bar 10 by any suitable means such, for example, as the screws 15 and 16.

Slidably mounted upon the bar 10 at the right hand end thereof as seen in the drawings, is a slide 17 which, as seen particularly in Figure 4, is in the form of a sleeve having an enlarged outer diameter at its upper side. The interior cylindrical surface of the sleeve is carefully finished to be a sliding fit on the bar 10, the sleeve being held in an adjusted position by means of a setscrew 18 threadedly inserted in the lower portion of the slide 17 and having a pointed end extending into a longitudinal groove 20 in the bar 10. Mounted for sliding movement in a bore 21 in the upper enlarged portion of the sleeve or slide 17 is a gaging anvil which consists of the anvil proper 22 and the shank 23.

Shank 23 is threaded, as indicated at 24, and also is provided with a longitudinal slot 25 into which extends a screw 26 threadedly mounted in the upper portion of slide 17, this screw preventing rotation of the shank 23 and anvil 22, but permitting longitudinal movement thereof.

Slide 17 is cut away as shown at 27 and an adjusting nut 28 is positioned in the cutout portion 27 being threaded upon the threads 24 of shank 23. Thus by rotating the nut 28 anvil 22 may be moved longitudinally of the bar 10.

A lock nut 30, which may be a cap nut, is also threaded upon the threads 24 of shank 23 the left hand surface of this nut bearing against the right hand edge of the enlarged upper portion of the slide 17. By means of the lock nut 30 the anvil 22 may be fixedly held in an adjusted position. Due to the construction just described, the slide 17 may be adjusted to a desired position along the bar 10 after which a fine adjustment of the position of the anvil 22 may be made by loosening the lock nut 30, adjusting the position of the anvil by operation of the adjusting nut 28, and retightening the lock nut 30.

Fixedly positioned in the end of bar 10 opposite the slide 17 is a pin 31 which, in the present instance, is a drive fit in a bore 32 extending through the bar 10 and at right angles to and on the longitudinal center line of the upper flat face 11 thereof. The pin 31 is provided with an upper rectangular portion 33 which constitutes a gaging anvil, the right hand surface of this anvil being of suitable wearing material 34 such as tungsten carbide. The anvil 22 of the slide 17 is also faced with tungsten carbide as indicated at 35.

The anvils 22 and 33 or more accurately the wearing surfaces 34 and 35 thereof are face ground and lapped to exact parallelism and also so that their parallel faces are perpendicular to the longitudinal axis of the bar 10. As a result, the anvil 22 may be accurately set a desired distance from the anvil 33 by the use of gaging blocks of the Johansson or Hoke type. The grinding and lapping operations are performed after the slide 17 and pin 31 have been placed in position and due to the construction heretofore described the anvil faces will retain their parallel relationship at any adjusted position of the slide 17 and the anvil shank 23. In this connection it will be noted that the use of screw 26 and the cooperating slot 25 of the shank 23 prevents rotation of anvil 22 and thus assures parallelism of the anvil faces 35 and 34 irrespective of the fine adjustments made on the anvil shank 23. Figure 2 illustrates the setting of the master setting gage of this invention to a stack of Johansson blocks, the blocks being indicated at 36, 37 and 38.

Mounted for limited longitudinal movement along the bar 10 is a block 40 which is provided at its right hand end, see Figure 1, with the faces 41 and 42 which together form a V, each of these faces being bevelled at its upper edge as is indicated at 43 and 44 respectively.

At the apex of the V formed by the two faces 41 and 42 the block is provided with a notch 49 into which the rectangular gaging anvil 33 extends. The faces 41 and 42 are adapted to make contact with the usual centralizing pins of a dial bore gage, these faces thus approximating the bore walls and thus causing the gage to be properly positioned with respect to the anvil faces 34 and 35 in a horizontal plane. The block 40 is capable of limited reciprocatory movement longitudinally of the bar 10, the block being provided with portions 45 and 46 having the same radius as the bar 10 and resting upon the upper curved portions thereof. Block 40 is held in adjusted position on the bar 10 by means of the screw 47 which extends through slot 48 in the block 38 and is threaded into a tapped opening 50 in the bar 10. Thus by loosening the screw 47, block 40 may be moved longitudinally to a desired position within the limits of adjustment permitted by the longitudinal width of the slot 48.

Threadedly mounted in a longitudinally extending aperture in the block 40 is a screw 51 which screw is adapted to bear against the screw 47, the screw 51 thus serving to permit the return of block 40 to a desired position after it has been moved to the left as is sometimes necessary when setting the gage to gaging blocks as previously discussed in connection with Figure 2.

The block 40 is normally set to make the points of contact of the centralizing plungers of a dial bore gage (such as that indicated generally at 52) with the faces 41 and 42 approximately the same as they will later have with the wall of a bore being gaged. The angle of the V is substantially supplemental to the angle which the centralizing plungers of the gage have with each other and therefore the centralizing plungers are approximately at right angles to the faces 41 and 42 just as these plungers would be approximately at right angles to the tangent to the bore wall at the point of contact.

Removably mounted on the anvil 22 is a sleeve 53 which has therein an opening 54 facing the anvil 33, the opening being of a size to admit the fixed gaging point 55 of a bore gage such as that indicated at 52 and to permit this fixed contact point to engage the face 35 of the anvil 22. This sleeve 53 thus serves to hold the contact point 55 in a fixed position as respects the vertical distance above the flat surface 11 of the bar 10, and by rocking the gage in a vertical plane about the point of contact between the anvil face 35 and the gage contact 55 the gaging plunger 56 is moved vertically along the anvil face 34 until a minimum reading exists, which minimum reading is that of the required distance between the anvil faces. The reading is a minimum since it is at right angles to the gaging faces in both the horizontal plane (due to the action of the centralizing plungers of the gage) and in a vertical plane (due to the rocking of the gage about the point of contact as mentioned above).

As has been indicated hereinabove, the setting master of our invention is accurately set to a desired dimension by first removing the sleeve 53 from the movable anvil 22 and also, if necessary, due to the size of the gaging blocks, sliding the block 40 to the left. Thereafter a stack of gaging blocks such as those indicated at 36, 37 and 38 of Figure 2 having a total dimension equal to the desired setting is placed on the flat upper face 11 of the bar 10 and against the anvil face 34. Slide 17 is then moved into position with anvil face 35 against the right hand end of the stack of gaging blocks which blocks, as will be understood, have been "wrung" together in the usual manner. The slide 17 is then clamped to the bar 10 by means of the screw 18 and thereafter anvil 22 is adjusted so that the anvil bears against the stack of gaging blocks with the required gaging pressure, which pressure is readily determined by a worker who is familiar with such operations. As will be obvious, the dimension between the gaging faces 34 and 35 is now exactly that of the stack of gaging blocks which are now removed leaving the master ready to receive a bore gage for adjustment thereof.

At this time the sleeve 53 is placed on the anvil 22 and fixed in position against the shoulder between the anvil proper and the shank 23 by means of a set screw 57. A dial bore gage to be set is now positioned in the device in the manner shown in Figures 1 and 3 with its measuring plunger 56 against the anvil face 34 and its fixed measuring extension 55 against the anvil face 35. As has been indicated, the centralizing plungers cause the dial bore gage, such as 52, to move into position such that the minimum distance between anvil faces 34 and 35 in the horizontal plane is measured and, additionally, by rocking the gage 52 about the point of contact between anvil face 35 and range extension 55, the minimum distance in a vertical plane between the two anvil faces is measured.

It will be understood that the range extension 55 of the dial bore gage is threadedly mounted in the gage head in the usual manner and is adjusted to bear against the anvil face 35 to set the gage to the dimension of the master. Additional adjustment is then made in the usual manner as the gage is rocked in the vertical plane, that is, by rotating the bezel ring and dial until the zero point of the indicator scale coincides with the minimum position of the indicator hand.

Referring now to Figures 6, 7 and 8, it will be seen that the dial bore gage setting master illustrated in these figures is essentially the same as that described above. The master of these figures is, however, intended for use with the larger sizes of bore gages and therefore the cylinder 10 is substituted for by a hollow thick walled cylinder 70, the slide 17 of the earlier figures being mounted upon the cylinder 70 in the same manner as upon the cylindrical bar 10.

The block 40 of the first embodiment of the device is in this second embodiment replaced by a casting 71 the faces 72 and 73 of which are inclined to each other forming a V. In this instance, inserts 74 and 75 are placed in the casting 71 and form the surfaces against which the centralizing plungers of the dial gage bear in order to centralize the gage in the horizontal plane. The casting 71 is provided with the slotted opening 76 permitting adjustment of the casting along the cylindrical sleeve or bar 70 in the same manner as block 40 may be adjusted along the bar 10. Although not shown in Figures 6, 7 or 8, a set screw similar to the set screw 51 of Figure 3 may be utilized in order that the casting 71 may be returned to a desired position after moving it toward the left in order to use the gaging blocks. However, because of the construction of the casting 71, particularly the fact that the gaging anvil here designated 77 is not recessed so far into the casting as is the anvil 33 in the block 40, it will generally be unnecessary to move the casting in order to utilize the blocks for setting the master to a desired dimension.

While preferred embodiments of the invention have been described, it will be understood that other modifications may readily be made within the scope of the invention. We desire therefore to be limited not by the foregoing description, but on the other hand, solely by the claim granted to us.

What is claimed is:

In a setting master for dial bore gages, in combination, a longitudinally extending cylindrical member forming a base, said member having a flat upper surface, a fixed gaging anvil fixedly mounted in said base and extending above said flat upper surface adjacent one end of said base, a slide member mounted on said base for movement toward and away from said fixed gaging anvil, said member comprising a cylindrical sleeve having a thicker walled upper portion, a second gaging anvil mounted in said thick walled portion for reciprocation with respect to said sleeve, means for causing reciprocatory movement of said second anvil with respect to said slide member, means for locking said second anvil in adjusted position whereby said second anvil may be positioned a predetermined distance from said first anvil along said base, a gage positioning member mounted on said upper flat surface of said base adjacent said fixed anvil, said gage positioning member having a face thereof adjacent said fixed anvil forming a V with the apex of the V at substantially the center line of said base and said fixed anvil, the open end of the V facing said second anvil, said V of said gage positioning member being adapted to move a dial bore gage into position to indicate the minimum distance between said gaging anvils in a horizontal plane, and a sleeve mounted on said movable gaging anvil and extending beyond the face thereof, said sleeve being adapted to encompass the fixed gaging button of the dial bore gage and to act as a pivot about which to rock the gage being set, to thereby indicate the minimum distance between said anvils in a vertical plane.

References Cited in the file of this patent

UNITED STATES PATENTS

| | | |
|---|---|---|
| 826,883 | Prewett | July 24, 1906 |
| 1,591,259 | Ames | July 6, 1926 |
| 1,617,284 | Ames | Feb. 8, 1927 |
| 2,201,832 | Kaehlert | May 21, 1940 |
| 2,241,440 | Thorpe | June 3, 1947 |
| 2,524,256 | Greany | Oct. 3, 1950 |
| 2,558,291 | Eisele | June 26, 1951 |
| 2,725,636 | Green | Dec. 6, 1955 |